(12) United States Patent
Mannheim Astete et al.

(10) Patent No.: US 11,420,424 B2
(45) Date of Patent: Aug. 23, 2022

(54) EMBEDDED WIRE LED LAMINATE (71) Applicant: AGP America S.A., Ciudad de Panama (PA)

(72) Inventors: Mario Arturo Mannheim Astete, Lima (PE); Gonzalo Rafael Vizcarra Mendoza, Lima (PE); Diego Alonso Vargas Duharte, Lima (PE); Charles Stephen Voeltzel, Lima (PE)

(73) Assignee: AGP America S.A., Panama (PA)

( * ) Notice: Subject to any disclaimer, the term of this patent is extended or adjusted under 35 U.S.C. 154(b) by 273 days.

(21) Appl. No.: 16/628,027

(22) PCT Filed: Jul. 1, 2018

(86) PCT No.: PCT/IB2018/054881
§ 371 (c)(1),
(2) Date: Jan. 1, 2020

(87) PCT Pub. No.: WO2019/008493
PCT Pub. Date: Jan. 10, 2019

(65) Prior Publication Data
US 2020/0130328 A1  Apr. 30, 2020

Related U.S. Application Data

(60) Provisional application No. 62/528,133, filed on Jul. 2, 2017.

(30) Foreign Application Priority Data

Sep. 13, 2017 (CO) .................... NC2017/0009266

(51) Int. Cl.
*B32B 17/10* (2006.01)
*E06B 3/66* (2006.01)
(Continued)

(52) U.S. Cl.
CPC .. *B32B 17/10541* (2013.01); *B32B 17/10018* (2013.01); *B32B 17/10174* (2013.01);
(Continued)

(58) Field of Classification Search
CPC ........ B32B 17/10541; B32B 17/10018; B32B 17/10174; B32B 17/10376;
(Continued)

(56) References Cited

U.S. PATENT DOCUMENTS 5,792,298 A     8/1998  Sauer et al.
2003/0230045 A1  12/2003  Krause
(Continued)

FOREIGN PATENT DOCUMENTS

GB    2511552 A  *  9/2014  ....... B32B 17/10036
GB    2511552 A      9/2014
(Continued)

*Primary Examiner* — Michael M. Bernshteyn
(74) *Attorney, Agent, or Firm* — The Morales Law Firm; Joseph L. Morales (57) ABSTRACT

The price and performance of LED lighting have reached the point where LEDs are displacing more traditional lighting. Even though LED lifetimes are as high as 50,000 hours, they are still being designed as replaceable bulbs rather than being integrated as a permanent part of the lighting assembly. The invention provides for a means of economically producing laminated glass with integrated LED lighting designed to last the life of the vehicle. This is done by embedding the LED die into the plastic layer used to bond the glass layers of a laminate together, forming an embedded wire circuit from thin high tensile strength Tungsten wire to power the LEDs and by utilizing machine tool technology originally developed to produce integrated circuit assemblies such as RFID ID cards, tickets and passports.

22 Claims, 12 Drawing Sheets (51) Int. Cl.
 *E06B 9/24* (2006.01)
 *B60J 1/00* (2006.01)
 *B60J 1/02* (2006.01)
 *B60J 1/08* (2006.01)
 *B60J 1/18* (2006.01)

(52) U.S. Cl.
 CPC ...... *B32B 17/10376* (2013.01); *E06B 3/6608* (2013.01); *E06B 9/24* (2013.01); *B32B 2605/006* (2013.01); *B60J 1/001* (2013.01); *B60J 1/02* (2013.01); *B60J 1/08* (2013.01); *B60J 1/18* (2013.01); *E06B 2009/2417* (2013.01)

(58) Field of Classification Search
 CPC ... B32B 2605/006; E06B 3/6608; E06B 9/24; B60J 1/001; B60J 1/02; B60J 1/08; B60J 1/18; B60J 2009/2417
 USPC .......................................................... 428/426
 See application file for complete search history.

(56) References Cited

U.S. PATENT DOCUMENTS

| | | |
|---|---|---|
| 2005/0207002 A1 | 9/2005 | Liu et al. |
| 2014/0098557 A1 | 4/2014 | Veerasamy |

FOREIGN PATENT DOCUMENTS

| | | | |
|---|---|---|---|
| WO | 2008071763 A1 | 6/2008 | |
| WO | WO-2009016581 A2 * | 2/2009 | ....... B32B 17/10036 |
| WO | 2009016581 A3 | 3/2009 | |
| WO | 2012031647 A1 | 3/2012 | |

* cited by examiner

EMBEDDED WIRE LED LAMINATE

FIELD OF THE INVENTION

This invention relates to the field of automotive vehicle laminates.

BACKGROUND OF THE INVENTION

While light emitting diodes (LED) have been in commercial use for over 50 years, it has only been in more recent years that the cost, size, color, light intensity and lifetime have improved to the point where the technology can compete with other forms of lighting such as incandescent. Indeed, the price point has been reached where LED bulbs for home and commercial lighting have a relatively short payback period from energy savings that most will actually reach and benefit from. For the most part, adaptation has been through installation of LED bulbs that are compatible with lighting devices that were originally designed for incandescent lighting. Ironically, most of these new states of the art lighting devices utilize Edison screw type threaded bases which are substantially the same as when they were first introduced in 1909.

The screw type base made perfect sense as the early carbon filament incandescent lights had a lifetime that was measured in hours. While the technology has vastly improved over the years, modern tungsten filament bulbs have a lifetime that is rated in the 500-2000 hour range so it still makes sense to have replaceable bulbs in lighting devices that are designed for incandescent bulbs.

In automotive applications, due to the extremes of temperature, shock, and vibration, incandescent bulbs are even more prone to failure than in static indoor installations. In automotive applications, LEDs have a major advantage as they are less susceptible to temperature extremes, shock, and vibration. An important additional benefit is that a LED reaches full brightness in less time than an incandescent bulb. While the difference is just a fraction of a second, in a vehicle traveling at a high rate of speed, it can make the difference between life and death. LED replacement bulbs for signals and cabin lighting have been available in the automotive aftermarket for a number of years. Many early adopters were willing to pay a premium to replace their incandescent bulbs with LED bulbs. Early Original Equipment Manufacturers (OEM) automotive applications were the brake lights where the faster rise time improved safety. Today we can find LED lighting in use in almost all of the traditional automotive light positions including head lamps. LED lighting is especially of value in battery powered vehicle where the higher efficiency and lower weight translates into extended range.

The estimated lifetime of current production LEDs is as high as 50,000 hours. Unlike incandescent bulbs, the end of life is not when the bulb stops producing light but when the intensity of the light drops to 70% of the original value. Over the typical life of an automotive vehicle, the LED will outlast the vehicle in most application. However, even though the bulb will outlast the vehicle, bulbs are still manufactured with the same replaceable base and socket design of their predecessors.

As the quality and durability of other automotive components has improved, we are seeing some adaptations in design and manufacture in response to the extended lifetimes. Drive shafts, control arms and other assemblies are often manufactured such that the individual components that comprise the assembly are not replaceable. When one of the components fails, the entire assembly must be replaced. This helps to reduce the initial cost of the assembly and the weight as well as reducing the part count.

Attempts have been made to incorporate LED lighting as an integral permanent part of other components. A common approach has been to add LEDs to laminated glass. Laminated glass is made by bonding two sheets of glass together by means of a thermoplastic bonding layer. All windshields are made from laminated glass. Laminated glass is also sometimes used for door windows, backlites, sunroofs and panoramic roofs.

The bonding layer used for most automotive laminates has a thickness of 0.76 mm (30 mils). The actual LED die is thinner and so can be incorporated into the bonding layer. The problems associated with commercializing this technology have been primarily in supplying power to the LED chip.

One approach has been to use a transparent conductive coating (TCO) on the glass to supply power. This approach requires that the TCO be etched to form the circuits, which is difficult and expensive as it requires either masking prior to coating or a large field LASER. The relatively poor conductivity of most TCOs also make it a poor choice for any more than a small number of LEDs and also limits their location. Another problem with the TCO approach is that it is difficult to establish a reliable permanent electrical connection to the TCO.

A similar approach makes use of a TCO applied to a plastic substrate. This improves processing as the plastic substrate can more easily be etched or masked and coated than a glass sheet. There are still issues bonding to the TCO. The introduction of the plastic substrate requires that a second bonding thermoplastic layer has to be added to the laminate, increasing cost and weight. Further, the shapes that can be laminated in this manner are limited. Large radii cylindrical laminates can be made but any shape that requires the substrate to stretch will result in a break of the continuity of the circuit.

Another similar approach is to produce and then laminate a flexible transparent printed circuit with conventional traces providing power. This method has the same drawbacks as the TCO coated substrate with respect to the shape of the laminate and limits the size of the circuit to that of the capabilities of the equipment used to manufacture the circuit. This approach is only practical where the visible conductors are not objectionable.

Attempts to power the LEDs in a laminate through the use of thin wires have failed to achieve commercial success due to the high cost and poor aesthetics of the resultant product. At least part of the reason would appear to be the method of assembly although it is difficult to evaluate as prior disclosures have failed to fully enable the means of assembly.

Clearly, it would be advantageous to solve these problems.

BRIEF SUMMARY OF THE INVENTION

The present invention is directed to LEDs laminated inside of vehicle glazings. LEDs oriented to radiate towards the interior are used to provide interior illumination, replacing the typical dome and reading lights as well as providing for other lighting applications that may not have been practical. Light sources, oriented to radiate towards the exterior, provide primary signals, such as the high mounted brake light and supplemental brake/turn signal lights. Hidden behind the glass, the lights are nearly invisible when not turned on.

Additionally, the invention uses CNC (computer numeric control) machine technology to produce a sheet of a thermoplastic containing LEDs 28 that is subsequently laminated between two glass layers. The CNC requires movement of the tool in the up/down, left/right and forwards/backwards directions (X, Y and Z) as well as a rotary axis perpendicular to the bed and a tool changer and tools to embed the wire 16, cut the wire 16, place the LED chips and connect the LED chips to the wires 16. Machines with this capability are commercially available.

For example, some of these machines are manufactured in Europe and Asia and are used to produce articles with embedded wire antennas and electronics for RFID (radio frequency identification) applications such as passports, identification cards, and admission tickets. Also, the CNC machine removes the LED chips from a reel and then places them on the plastic sheet. The sheet is held flat and in place by means of vacuum holes on the bed of the machine.

After the LEDs 28 have been placed, the tool is changed and the wire 16 is dispensed connecting the LEDs 28 and forming the circuits to power the LEDs. The wire 16 used is a fine, black, drawn, solid, uninsulated, Tungsten wire, the same as used to make the filaments of incandescent lights. The wire 16 is substantially embedded in the plastic bonding layer 4 through the use of heat and pressure. Ultrasound may also be used in conjunction with pressure to embed the wire 16. The wire 16 may be cut by mechanical means or through the use of a LASER. Through the use of a LASER, the wire 16 for the entire circuit can be dispensed as a single continuous length and all of the cuts can be made saving time.

Particularly, the selection of Tungsten for the power wiring may appear counter-intuitive due to its relatively high resistivity. However, while the resistivity of Tungsten is three times that of Copper, the tensile strength is twelve times that of Copper. The higher strength allows for the wire 16 to be embedded at a much higher speed and also to withstand handling during assembly better with a lower probability of breakage. The wire 16 is electrically connected to the LEDs 28 by means of a conductive adhesive, crimping, welding, soldering or other suitable means. Even with the higher resistance of the Tungsten, due to the low power requirements of the LEDs, a very thin wire 16 can still be used.

On the other hand, flexible connectors 12 are used to make the electrical connections to the wires 16 and to bring the connections out from inside of the laminate. Accordingly, a wire 16 can be terminated at a flexible connector 12.

Additionally, touch sensors 14 can optionally be embedded in the plastic bonding layer 4 as well. Light diffusers 30 can be created by treating the glass surface or by applying to the glass. Likewise, reflectors 34 can also be added behind the LEDs. Thin plastic lenses may be laminated inside of the glazing or applied to the exterior of the laminate. Also, an obscuration 6, for example, a black frit, may have openings or apertures 8 which can be used to frame the LEDs 28 and to block the view from the opposite side as needed. A transparent conductive coating 18 or a transparent conductive coated performance film can be used to prevent triggering of the touch sensors 14 from the opposite side of the laminate (rain) if needed. A variable light transmittance performance film may also be included in the laminate to enhance the aesthetics of the LEDs. The laminate may be produced for any of the glazed positions of the vehicle. The LEDs 28 may be used to provide for lighting of the interior or exterior of the vehicle, signaling and for general aesthetic application. A dark glass composition, performance film, plastic layer or coating may be used to reduce the visible light transmission through the laminate further hiding the wires 16 from view.

Some advantages of the laminate and method of the present invention are the following:
Energy savings;
Weight savings;
Lower number of parts;
Lower cost;
Lower final assembly labor; and
Product differentiation

REFERENCE NUMERALS

2 Glass
4 Plastic bonding interlayer
6 Obscuration
8 Aperture
12 Flexible Connector
14 Touch Sensor
16 Wire
18 Transparent Conductive Coating
28 LED
30 Diffuser
32 Lens
34 Reflector
36 Performance Film
101 Number one surface
102 Number two surface
103 Number three surface
104 Number four surface
201 Exterior glass layer
202 Inner glass layer

DETAILED DESCRIPTION OF THE INVENTION

An object of the present invention is to provide a laminated glass assembly comprising at least one LED 28, the associated wiring 16, touch sensor 14, and a connector 12 as well as the method of manufacture.

The laminate of the present invention is particularly used in vehicle applications, but should be understood that other applications, such as architectural, can be also used. The laminate of the present invention comprises:

a. an exterior glass layer 201 having a surface one 101 located outside the vehicle and an oppositely surface two 102;
b. at least an inner glass layer 202 having a surface four 104 located inside the vehicle and an surface three 103;
c. at least one plastic bonding layer 4 located between the exterior glass layer 201 and the inner glass layer 202, wherein the plastic bonding layer 4 bonds the surface two 102 of the exterior glass layer 201 to the surface one 101 of the inner glass layer 202;
d. at least one LED 28 embedded to the plastic bonding layer 4; and
e. a wire 16 substantially embedded in the plastic bonding layer 4 forming a circuit to power the LED.

While the embodiments and examples described are panoramic roof laminates, as can be appreciated the invention can be implemented in any of the other glazed positions of a vehicle without deviating from the intent from the invention.

Particularly, glazing, in the context of this document, shall mean any safety glazing certified to any of the regulatory standards for automotive safety glazing. Laminated safety glass is made by bonding two sheets of annealed glass 2 together using a thin sheet of a transparent plastic bonding layer 4 as shown in FIG. 3.

Annealed glass is a glass that has been slowly cooled from the bending temperature down through the glass transition range. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the glass. A vehicle with a broken windshield can still be operated. On impact, the plastic bonding layer 4 also helps to prevent penetration by the occupant in the event of a crash and by objects striking the laminate from the exterior.

Figure 3:
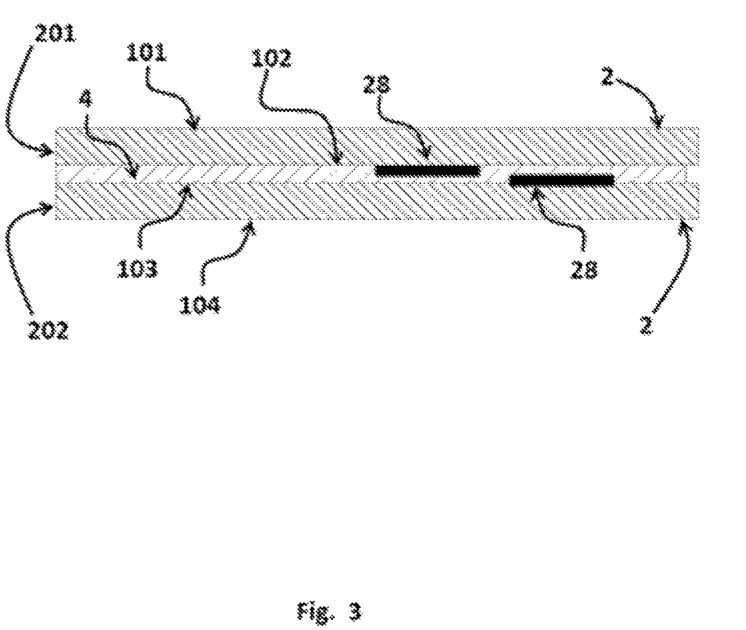
FIG. 3 shows a typical laminated glass cross-section.

Additionally, standard terminology is used to describe the configuration of a laminated glazing as shown in FIG. 3. For instance, a normal automotive windshield is comprised of two layers of glass, one outer glass layer 201, and one interior glass layer 202 that are permanently bonded together. The glass surface that is on the outside of the vehicle is referred to as surface one 101 or the number one surface. The opposite face of the exterior layer of glass 201 is surface two 102 or the number two surface. The glass surface that is on the inside of the vehicle is referred to as surface four 104 or the number four surface. The opposite face of the inner glass layer 202 is surface three 103 or the number three surface.

Particularly, glass layers are formed using gravity bending, press bending or cold bending. Gravity bending, cold bending and press bending methods for forming glass are well known in the art and will not be discussed here.

For example, glass options include but are not limited to: the common soda-lime variety typical of automotive glazing as well as aluminosilicate, lithium aluminosilicate, borosilicate, glass ceramics, and the various other inorganic solid amorphous compositions which undergo a glass transition and are classified as glass included those that are not transparent.

One of the big advantages of a laminated glazing over painted sheet metal is that the laminate can more efficiently reflect solar energy through the use of an infrared reflecting coating or film. Even without an infrared reflecting layer, the glass will reflect more solar energy than a painted surface. Glass, being a poor conductor of heat, also helps to slow the transfer of solar energy to the passenger cabin while with an emissivity of over 0.9, it helps to cool a hot vehicle by radiating heat from the inside of the vehicle to the outside air.

Particularly, infrared reflecting coatings include but are not limited to the various metal/dielectric layered coatings applied through vacuum deposition as well as others known in the art that are applied via pyrolytic, spray, CVD and dip. For example, infrared reflecting films may include both metallic coated substrates as well as organic-based optical films which reflect in the infrared.

On the other hand, the plastic bonding layer 4 has the primary function of bonding the major faces of adjacent layers to each other. As an example, surface two 102 of the exterior glass layer 201 is bonded to surface one 101 of the layer adjacent and below, for example the inner glass layer 202, by the plastic bonding layer 4. The material selected is typically a clear plastic when bonding to another glass layer 2. For automotive use, the most commonly used plastic bonding layer 4 or interlayer is polyvinyl butyl (PVB). In addition to polyvinyl butyl, ionoplast polymers, ethylene vinyl acetate (EVA), cast in place (CIP) liquid resin and thermoplastic polyurethane (TPU) can also be used.

An obscuration 6 such as black frit is a type of ink made from a mix of high-temperature black pigments, finely ground glass and an organic carrier and binder. An obscuration 6 black fit is commonly applied by silk screen printing or ink jet printing and used on automotive glazing to provide for an obscuration to hide the interior trim and the adhesive used to mount the glazing in the vehicle. The obscuration 6 black frit is applied before the bending of the glass. During the bending process, the glass powder fuses with the surface of the glass making for a durable permanent bond. For example, an obscuration 6 like a black frit may be used to provide for the grey tinted layer required by printing on surface two 102 of the glass layer 2 or surface three 103 or four 104 of the roof laminate comprises at least two glass layers.

Figure 4:
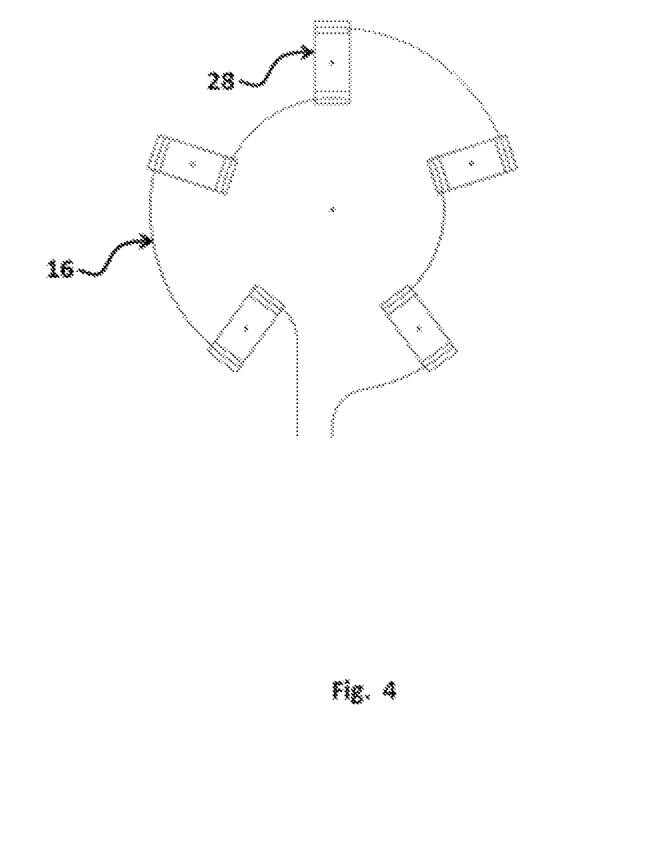
FIG. 4 shows a circuit with five LEDs in series.

In some of the laminates of the present invention, the LEDs 28 are connected in series circuits so as to allow the applied volt system voltage to power strings of LEDs 28 with the voltage dropping across each to the appropriate level required. FIG. 4 shows one possible circular arrangement of five LEDs 28 in series. The number may be increased or decreased depending upon the requirements of the circuit. Multiple series strings can be wired to a single set of feed wires in parallel or may be terminated directly at the connector 12.

Figure 5:
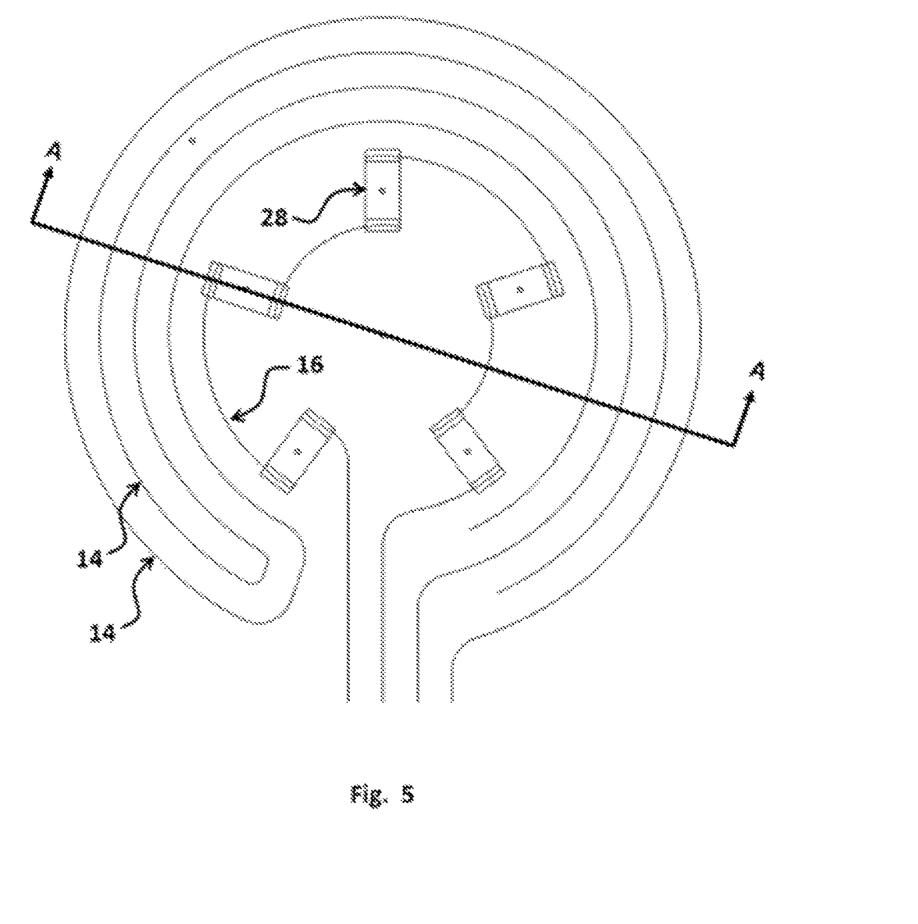
FIG. 5 shows a circuit with five LEDs in series and touch-sensitive sensor.

For example, FIG. 5 shows five LEDs 28 in series plus a capacitive touch sensor 14 comprised of two wire loops that do not intersect. This feature eliminates the need for an added expense of a mechanical on/off switch. Touch sensors 14 are known in the art and may be implemented in any number of ways other than as shown without deviating from the intent of the invention. Depending upon the location, design, and type of touch sensor 14, a metallic shield may be required to prevent interference from the presence of a dielectric (water) on the opposite side of the touch sensor 14. A transparent conductive coating 18 may be used for this purpose as well as to improve the solar performance of the glazing.

Additionally, the LEDs 28 may all be terminated at a single connector 12. In some embodiments, the thickness of the flexible connector 12 is less than 0.6 mm. Alternately, multiple connectors 12 may be used. The choice will depend upon the designer and tradeoffs that are made. A longer wire run will require a larger diameter wire to carry the current. In several embodiments, the wire diameter is between about 18 μm and about 200 μm.

Figure 1:
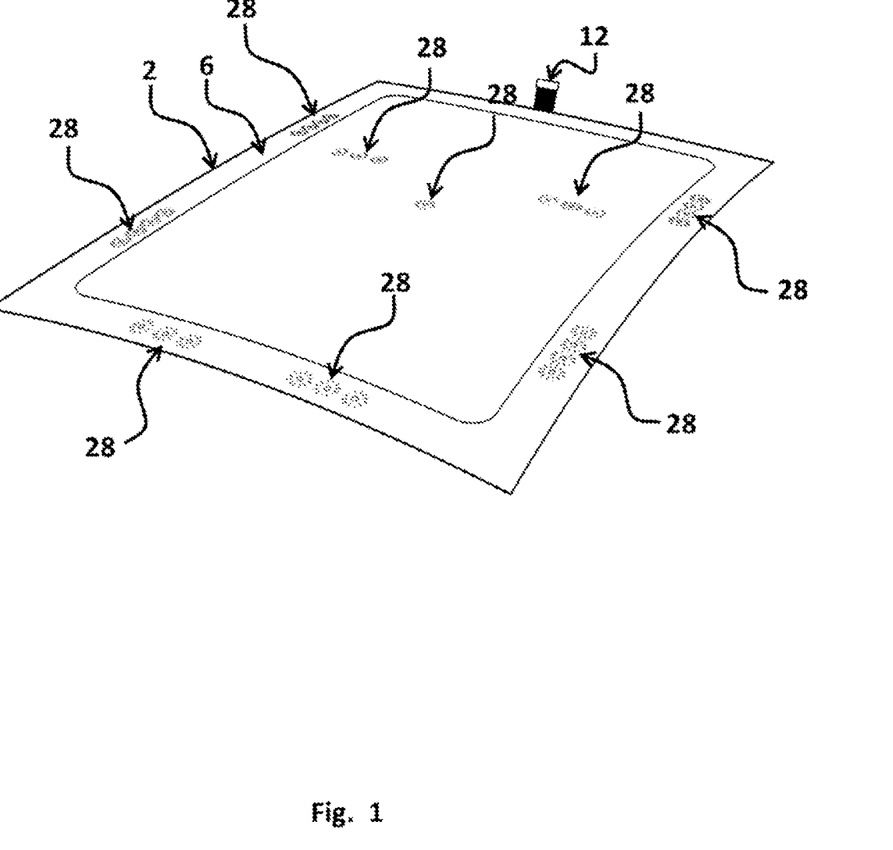
FIG. 1 shows a panoramic roof with interior lighting.
Figure 2:
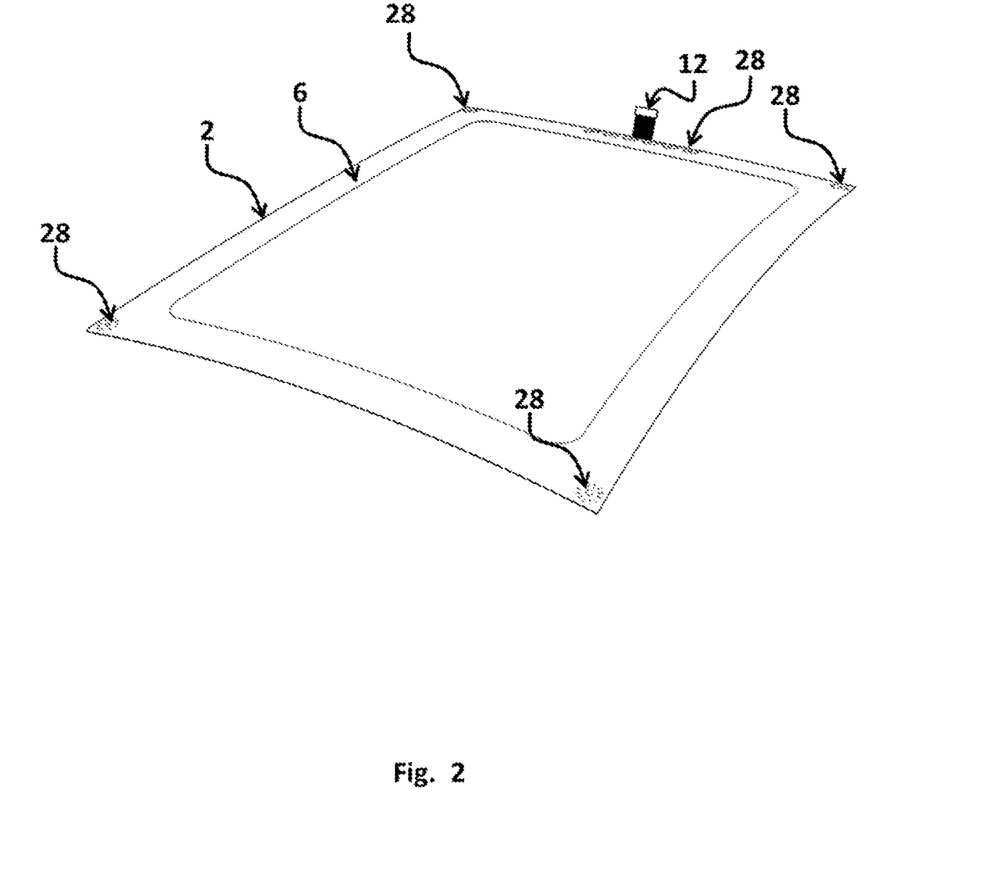
FIG. 2 shows a panoramic roof with exterior signal lighting.

On the other hand, the various exemplary embodiments shown are all variations of a large panoramic laminated glass roof for a four-door sedan as shown in the isometric views of FIGS. 1 and 2. In FIG. 1, the LEDs 28 are positioned with the light emitting side of the chip facing the interior of the vehicle and provide for interior illumination. The conventional centrally located dome light is replaced by a set of LED lights as are the driver and front passenger reading lights.

Likewise, additional lighting is provided above each of the doors, to assist with ingress and egress from the vehicle and a set of rear passenger reading lights is also provided. In FIG. 2, the LEDs 28 are positioned with the light emitting side of the chip facing the exterior of the vehicle. The LEDs 28 are used for signaling with the high mounted stop light at the rear, and each for four turn signal secondary indicators at each corner.

Depending upon the complexity of the circuit, the diameter of the wire 16 and the thickness and number of LEDs, a second plastic bonding layer 4 may be needed as shown in some of the embodiments. For example, the wire 16 diameter may be between about 18 μm and about 200 μm.

Additionally, it is preferable, due to the added cost and weight to use only one plastic bonding layer 4. Also, having the wires 16 and LEDs 28 in direct contact with the glass allows for better transfer and dissipation of the heat. While the LEDs 28 are very efficient, they still do produce some heat.

For example, the LEDs 28 should be distributed such that the power density is no more than 10 watts per square decimeter.

Figure 12A:
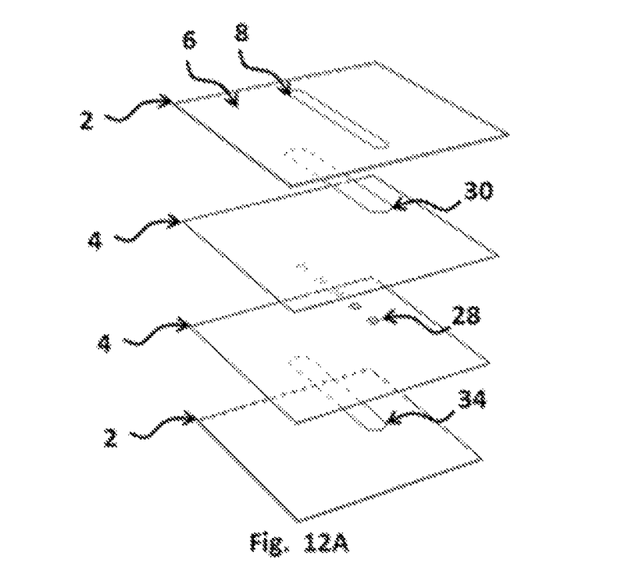
FIG. 12A shows an exploded view of a laminate comprising laminated LEDs with reflector and diffuser.
Figure 12B:
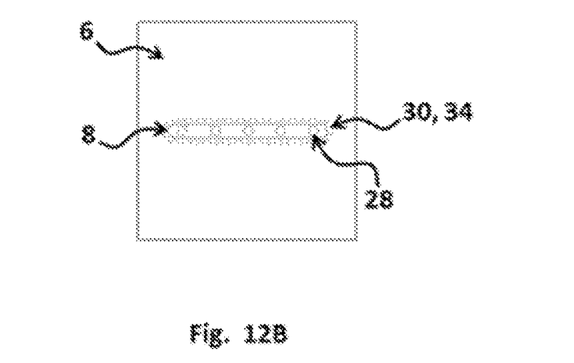
FIG. 12B shows a top view comprising laminated LEDs with reflector and diffuser.

In addition, a light diffuser 30 may be added through surface treatment of the glass, a coating applied to the surface of the glass or a component bonded to the glass, as is shown in FIGS. 12A and 12B. Likewise, a reflector 34 may be added through a surface treatment, coating or component. For some types of lighting, a lens 32 may be desirable to focus the light. A flat Fresnel type lens 32 may be laminated adjacent to the plastic bonding layer 4 or a Fresnel or other type of lens 32 may be bonded to the surface of the glass on the exterior or interior surface of the laminate.

On the other hand, it has been found that a dark tint plastic bonding layer 4, especially in conjunction with a dark tint glass composition, helps to hide the embedded wires 16. For instance, the embodiments described all have a total visible light transmission of less than 5%, but it should be understood that the plastic bonding layer 4 can have different values of visible light transmission depending on the requirements, for instance it may be less than 20%.

Additionally, in the laminate, at least one glass layer either the outer glass layer 201, or the inner glass layer 202, and in many instances both of the glass layers 201, 202, typically will have a black obscuration applied so as to hide any adhesive or attachments from the opposite side of the laminate and to also hid the edges of a coating or film which may be integrated into the laminate.

For example, a black frit or an equivalent obscuration 6 may be used to cover the LED so as to prevent visibility from the opposite side of the laminate as the intended light path. It may also be patterned with apertures 8 in the black obscuration so as to frame and improve the aesthetic of the LED lighting as illustrated in FIGS. 12A and 12B.

Embodiment 1

Figure 6:
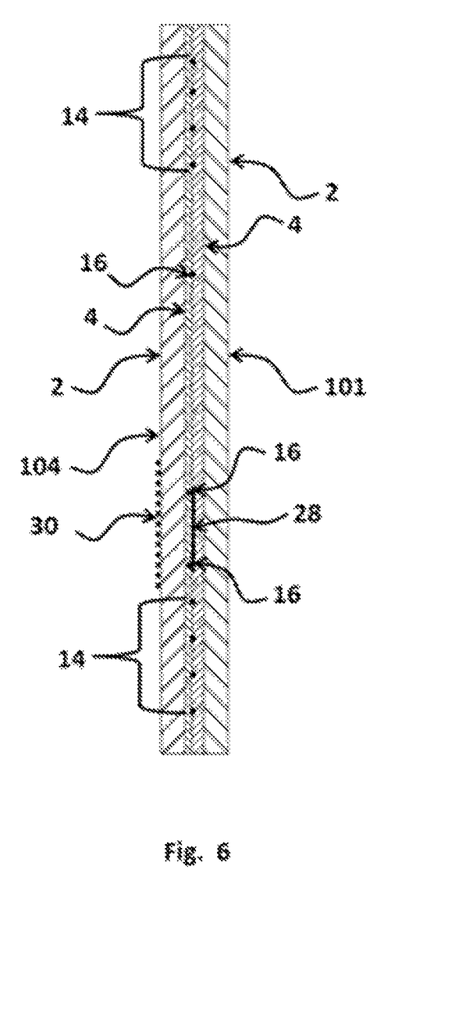
FIG. 6 shows a section of a laminate with a diffuser on the number four surface and two plastic layers.

FIG. 6 shows a cross-section of a panoramic roof comprising two 2.1 mm dark heat absorbing glass layers 2 laminated with a 0.76 mm plastic bonding layer 4 of grey tinted PVB and a 0.38 mm plastic bonding layer 4 of clear PVB. The wires 16 and LEDs 28 are embedded in the 0.76 mm plastic bonding layer 4 PVB layer. A plastic light diffuser 30 is bonded to the surface four 104 of the glass on the interior side of the laminate. The laminate also contains an embedded wire touch sensor 14.

Embodiment 2

Figure 7:
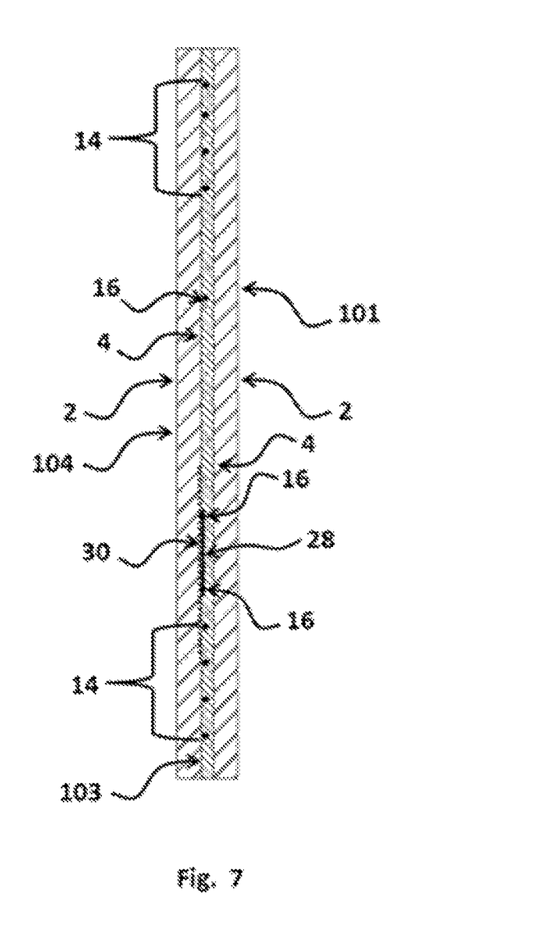
FIG. 7 shows a section of a laminate with diffuser located in the number three surface.

FIG. 7 shows a cross-section of a panoramic roof comprising two 2.1 mm dark heat absorbing glass layers 2 laminated with a single 0.76 mm plastic bonding layer 4 of grey tinted PVB. The wires 16 and LEDs 28 are embedded in the 0.76 mm PVB layer. A plastic light diffuser 30 is bonded to the surface three 103. The laminate also contains an embedded wire touch sensor 14.

Embodiment 3

Figure 8:
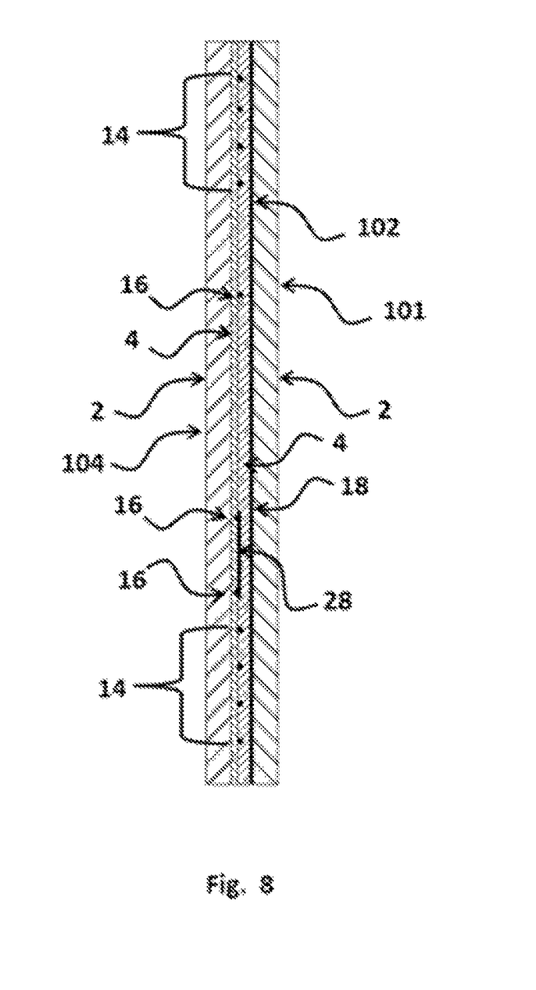
FIG. 8 shows a section of a laminate with a coating applied on surface number two and two plastic layers.

FIG. 8 shows a cross-section of a panoramic roof comprising two 2.1 mm dark heat absorbing glass layers 2 laminated with a 0.76 mm plastic bonding layer 4 of grey tinted PVB and a 0.38 mm plastic bonding layer 4 of clear PVB. The wires 16 and LEDs 28 are embedded in the 0.76 mm plastic bonding layer 4. A TCO infrared reflecting coating 18 is applied to the surface two 102 of the glass. The laminate also contains an embedded wire touch sensor 14.

Embodiment 4

Figure 9:
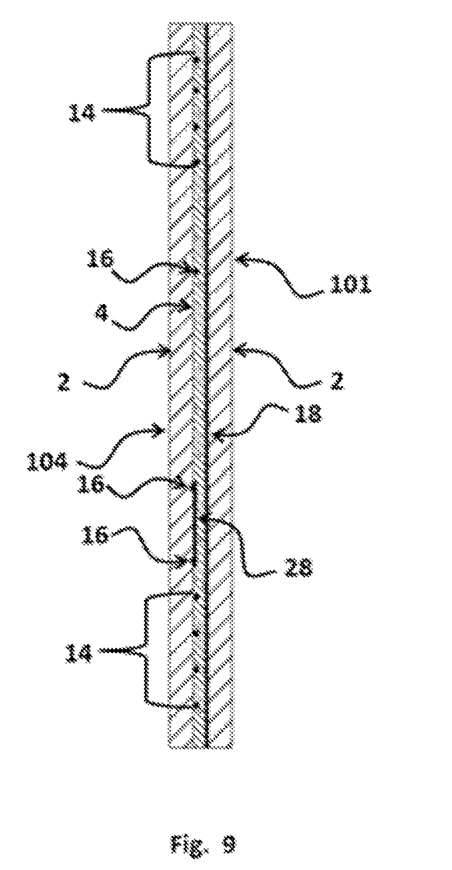
FIG. 9 shows a section of a laminate with a coating applied to a glass layer on surface number two.

FIG. 9 shows a cross-section of a panoramic roof comprising two 2.1 mm dark heat absorbing glass layers 2 laminated with a single 0.76 mm plastic bonding layer 4 of grey tinted PVB. A TCO infrared reflecting coating 18 is applied to the surface two 102 of the glass. The wires 16 and LEDs 28 are embedded in the 0.76 mm PVB layer. The laminate also contains an embedded wire touch sensor 14.

Embodiment 5

Figure 10:
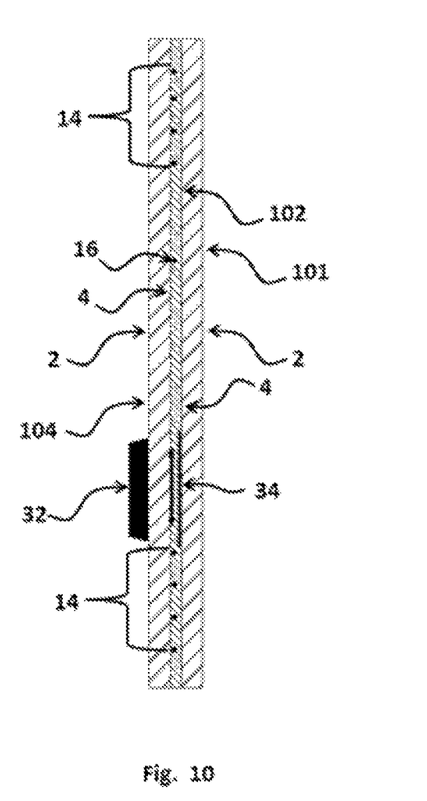
FIG. 10 shows a section of a laminate with a lens on surface number four located and with a reflector on surface number two.

FIG. 10 shows a cross-section of a panoramic roof comprising two 2.1 mm dark heat absorbing glass layers 2 laminated with a single 0.76 mm plastic bonding layer 4 of grey tinted PVB. The wires 16 and LEDs 28 are embedded in the 0.76 mm PVB plastic bonding layer 4. A plastic reflector 34 is bonded to the surface two 102 and a plastic lens 32 is bonded to the surface four 104. The laminate also contains an embedded wire touch sensor 14.

Embodiment 6

Figure 11:
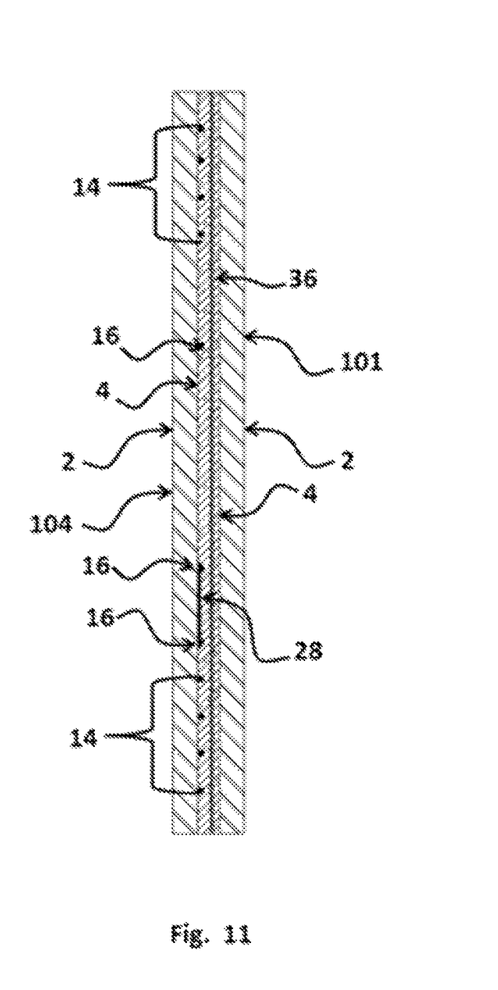
FIG. 11 shows a section of a laminate with a performance film located between two plastic layers.

FIG. 11 shows a cross-section of a panoramic roof comprising two 2.1 mm dark heat absorbing glass layers 2 laminated with a 0.76 mm plastic bonding layer 4 of grey tinted PVB and a 0.38 mm layer of clear PVB. A performance film 36 is laminated between the two PVB layers. The wires 16 and LEDs 28 are embedded in the 0.76 mm PVB layer. The laminate also contains an embedded wire touch sensor 14.

The forms of the invention shown and described in this specification represent illustrative preferred embodiments and it is understood that various changes may be made without departing from the spirit of the invention as defined in the following claimed subject matter.

The invention claimed is:

1. A vehicle laminate, comprising:
   an exterior glass layer;
   at least an inner glass layer;
   at least one plastic bonding layer located between the exterior glass layer and the inner glass layer;
   at least one LED embedded into the plastic bonding layer; and
   a wire embedded in the plastic bonding layer forming a circuit to power the LED.

2. The laminate of claim 1, wherein the wire material is tungsten.

3. The laminate of claim 1, wherein the wire diameter is between about 18 μm and about 200 μm.

4. The laminate of claim 1, wherein the wire is terminated at a flexible connector.

5. The laminate of claim 4, wherein the thickness of the flexible connector is less than 0.6 mm.

6. The laminate of claim 1, wherein the power density of the LED circuit is less than 10 watts per square decimeter.

7. The laminate of claim 1, further comprising at least one touch sensor integrated into the laminate.

8. The laminate of claim 7, wherein the touch sensor is comprised of embedded wire.

9. The laminate of claim 7, further comprising a transparent conductive coating isolating the touch sensor from the exterior of the laminate.

10. The laminate of claim 1, wherein the total visible light transmission is less than about 10%.

11. The laminate of claim 1, wherein the laminate includes an obscuration having apertures, wherein the LED is located in the apertures.

12. The laminate of claim 11, wherein the obscuration is located above the LED in order to hide the LED.

13. The laminate of claim 1, further comprising at least one light directing lens, wherein the light directing lens is laminated adjacent to the plastic bonding layer or bonded to the surface of the glass on the exterior or interior surface of the laminate.

14. The laminate of claim 1, further comprising at least one light reflector, wherein the light reflector is bonded to the surface two of the exterior glass layer or is added through a surface treatment, coating or component.

15. The laminate of claim 1, further comprising an anti-reflective coating applied to the surface two.

16. The laminate of claim 1, further comprising a second bonding layer bonded to the first bonding layer.

17. A vehicle comprising the laminate of claim 1.

18. A method for manufacturing a laminate having embedded LEDs, comprising:
   a) providing an outer and inner glass layers;
   b) providing a plastic bonding layer between the glass layers;
   c) placing LEDs on the plastic bonding layer;
   c) dispensing a wire in the plastic bonding layer, and connecting the wire to the LEDs;
   d) cutting the wire; and
   e) laminating the exterior glass layer with the interior glass layer.

19. The method of claim 18, wherein the wire is embedded in the plastic bonding layer by using heat and pressure, ultrasound or combinations thereof.

20. The method of claim 18, wherein the wire is cut in step d) by mechanical means or by a LASER.

21. The laminate of claim 1, wherein said one or more LEDs and wires are embedded directly into the plastic bonding layer in the direction of the internal surface of the laminated glass.

22. The laminate of claim 21, wherein the plastic bonding layer is in contact with the inner glass layer.

* * * * *